No. 719,240. PATENTED JAN. 27, 1903.
T. LYDON.
MEANS FOR PURIFYING THE WATER OF DAMS OR RESERVOIRS.
APPLICATION FILED OCT. 7, 1902.
NO MODEL.

Witnesses
H. J. Meyer, Jr.
Charles L. Vietsch.

Inventor
Timothy Lydon
By Mann & Co.
Attorneys

UNITED STATES PATENT OFFICE.

TIMOTHY LYDON, OF BALTIMORE, MARYLAND.

MEANS FOR PURIFYING THE WATER OF DAMS OR RESERVOIRS.

SPECIFICATION forming part of Letters Patent No. 719,240, dated January 27, 1903.

Application filed October 7, 1902. Serial No. 126,295. (No model.)

*To all whom it may concern:*

Be it known that I, TIMOTHY LYDON, a citizen of the United States, residing at Baltimore city, State of Maryland, have invented certain new and useful Improvements in Means for Purifying the Water of Dams or Reservoirs, of which the following is a specification.

This invention relates to improved means for purifying the water of dams and reservoirs by drawing off the slime and other precipitated impurities from the bottom; and it consists, essentially, in providing a dam or reservoir at its bottom with a drain-pipe having numerous intake-apertures, said pipe being normally closed at its discharge end, so that it will not interfere with keeping the dam or reservoir at a predetermined level nor interfere with drawing off the surface water to supply the mains, but being capable of being opened at such discharge end, so that when thus open the water at the bottom will flow through the intake-apertures in the drain, carrying with it all precipitated impurities, and be carried off to a suitable point instead of going into the mains. By this arrangement the dam or reservoir does not need to be emptied of its water for the purpose of cleaning the bottom, nor does the bottom need to be stirred up to draw off the impurities, thereby avoiding the necessity of at any time cutting off the water-supply from the mains or of disturbing the precipitated impurities, with the liability of their mixing again with the water that is to be supplied to the mains.

The invention is illustrated in the accompanying drawings, in which—

Figure 1:
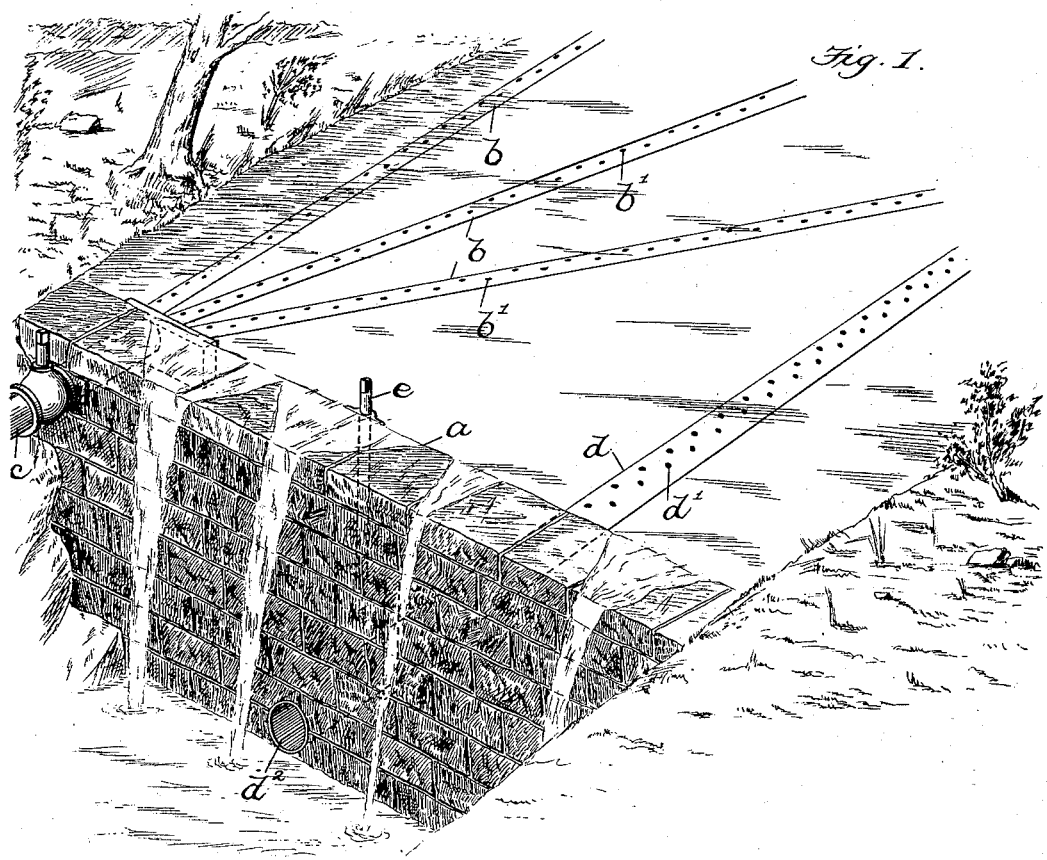
Figure 2:
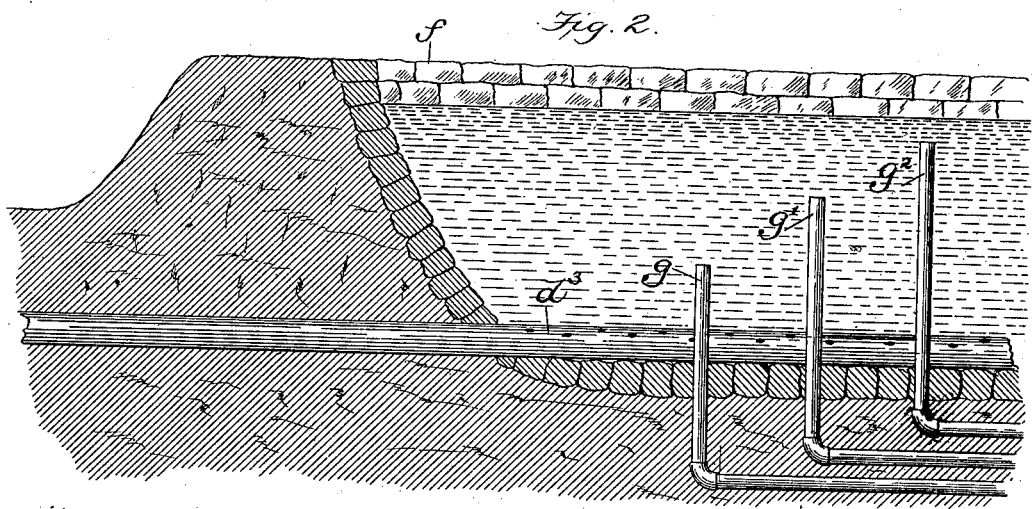

Figure 1 is a perspective view of a dam supplied with my improved means for draining its bottom, and Fig. 2 is a cross-sectional view of a reservoir also supplied with the improvement.

Referring to the drawings, Fig. 1, the letter $a$ designates a dam of any suitable construction across a running stream, and $b$ designates pure-water-discharge pipes held by any preferred means below and preferably near the surface of the dammed stream and converging to a common point, where they connect with the main $c$, as illustrated. Each of these discharge-pipes is provided with a plurality of apertures $b'$, through which the pure water may enter the pipe.

The letter $d$ designates a drain-pipe resting on the bottom of the stream and extending through the dam, as shown, and said drain-pipe is provided with numerous intake-apertures $d'$, which may be located entirely around the circumference of the pipe or partly around, as may be desired. The discharge end $d^2$ of said drain-pipe is normally kept closed by any suitable head-gate $e$ or similar device; but when said end is opened by raising the head-gate all the precipitated impurities will be passed into said drain-pipe and be discharged to some suitable point outside the dam. As soon as the water flowing out of said drain-pipe shows clear the head-gate may be again lowered to close said pipe. Preferably the drain-pipe gradually tapers from its discharge end to its other end, because of the ever-increasing volume it must take care of as the water and slime flow toward the discharge end.

The principle of the invention is illustrated in Fig. 2 as embodied in a reservoir $f$, in which are shown three pure-water pipes $g$ $g'$ $g^2$, adapted to supply the mains and whose intake ends are at different heights, so that the water may be drawn off, as desired, from different levels. The drain-pipe $d^3$ illustrated in said figure is the same in construction as that illustrated in Fig. 1; but I do not limit myself to the exact shape of said drain-pipe, for it may be straight or otherwise—for instance, ring-like—if desired.

The operation of the device for reservoirs is the same as that described for dams.

Having thus fully described my invention, what I claim as new, and desire to secure by Letters Patent, is—

A dam or reservoir, provided below the surface with one or more pure-water-discharge pipes, and also provided at its bottom with a drain-pipe extending along said bottom and tapering from its discharge end to its other end, said drain-pipe having in its side walls numerous intake-apertures and also having at its discharge end means whereby such end may be closed and opened, as and for the purpose set forth.

In testimony whereof I affix my signature in the presence of two witnesses.

TIMOTHY LYDON.

Witnesses:
NATHAN ALLEN,
JAMES H. SINCLAIR.